United States Patent [19]

Barrett et al.

[11] Patent Number: 4,972,364
[45] Date of Patent: Nov. 20, 1990

[54] MEMORY DISK ACCESSING APPARATUS

[75] Inventors: Gerald G. Barrett; Syed Z. Pasha; Amal A. Shaheen-Gouda, all of Austin, Tex.

[73] Assignee: International Business Machines Corporation, Armonk, N.Y.

[21] Appl. No.: 342,727

[22] Filed: Apr. 24, 1989

Related U.S. Application Data

[63] Continuation of Ser. No. 14,902, Feb. 13, 1987, abandoned.

[51] Int. Cl.⁵ .............................................. G06F 13/14
[52] U.S. Cl. ................................ 364/900; 364/952.1; 364/960
[58] Field of Search ... 364/200 MS File, 900 MS File; 365/241

[56] References Cited

U.S. PATENT DOCUMENTS

| | | | |
|---|---|---|---|
| 4,232,365 | 11/1980 | Englund | 364/200 |
| 4,246,637 | 1/1981 | Brown et al. | 364/200 |
| 4,371,927 | 2/1983 | Wilhite et al. | 364/200 |
| 4,371,929 | 2/1983 | Brann et al. | 364/200 |
| 4,400,793 | 8/1983 | Schuenemann | 364/900 |
| 4,484,262 | 11/1984 | Sullivan et al. | 364/200 |
| 4,489,378 | 12/1984 | Dixon et al. | 364/200 |

Primary Examiner—Michael R. Fleming
Assistant Examiner—Debra A. Chun
Attorney, Agent, or Firm—Thomas E. Tyson

[57] ABSTRACT

A data processing system including at least one storage device for storing and retrieving data from several rotating tracks where each track includes sequentially located blocks for the storage of data. A storage interface is connected for controlling this storage device. The storage interface includes a data buffer for storing data retrieved from the storage device. A storage driver is provided that receives storage access commands from a processor and provides commands to the interface in response to these commands from the processor. This storage driver further includes the capability to provide commands for requesting data that has not been requested by the processor. This data not requested by the processor is stored in a data buffer. These commnads for data not requested by the processor are issued in accordance to procedure that computes these commands called read ahead commands based on the order of commands received from the processor and also based on the number of storage devices in use.

18 Claims, 6 Drawing Sheets

MEMORY DISK ACCESSING APPARATUS

This is a continuation of application Ser. No. 014,902, filed Feb. 13, 1987, now abandoned.

CROSS REFERENCE TO RELATED COPENDING APPLICATION

This application is related to copending U.S. patent application No. 014,901, filed 2/13/87, entitled "Memory Disk Buffer Manager".

TECHNICAL FIELD

This invention relates to the accessing of data from a mass memory storage device and specifically to the accessing of data from a rotating memory medium.

BACKGROUND ART

Most data processing systems require mass memory storage facilities that store large amounts of data. One such mass memory device is a hard file or hard disk. The hard file includes several surfaces that have a magnetic code for the magnetic storage of data. Data is stored and retrieved by the moving of a magnetic sensor or head over the surfaces. The surfaces are rotated at a high speed. Heads are located on top of each surface and are connected by an arm. Data is stored on the surfaces in concentric channels termed tracks Each set of tracks on different surfaces but with the same radius is called a cylinder. Each track includes a series of sequentially located sectors that are addressable for the storage and retrieval of data. When the heads are located on top of tracks of a specific cylinder, the arm does not move for reading or writing data from or to sectors on that cylinder. When information is located on a different track, the head will have to be relocated over that track to read or write data into sectors of that track. The movement of this arm is termed a seek operation.

As the speed of the data processing systems increases, so does the demand for a greater access speed. In some cases the speed of the rotating surface and the speed of the head in locating tracks can limit performance of the overall data processing system. This problem occurs when the access commands from the data processing system are not received fast enough to permit adjacent sectors to be accessed on the hard file surface in the same revolution. In other words, the head will have to wait for a second revolution for the next sector in the sequence to be accessed. If sequential sectors are being accessed from a specific surface and the arm is required to change cylinders because of an additional data request on another cylinder, the time to reposition the head over the new cylinder track to read the successive data block (seek time) increases the access time for data retrieval. Also the access time is increased by the rotational delay. Once the head is on the required cylinder the data transfer cannot start until the required sector is under the head.

It is an object of the present invention to provide an apparatus to decrease the access time for data from a rotating hard file.

DISCLOSURE OF THE INVENTION

In accordance with the present invention a data processing system is disclosed that includes at least one storage device for storing and retrieving data from a plurality of rotating tracks each including sequentially located sectors for the storage of data. This data processing system further includes a storage interface for controlling the storing and retrieving of data from the storage device. This interfacing includes a data buffer for storing data to and from the storage device. A storage driver is included that is connected to the interface and it receives storage device access commands from a processor and provides commands to the interface in response thereto. This driver includes the capability of providing commands for data that has not been requested by the processor.

In the preferred embodiment a data processing system is disclosed that includes at least one storage device for storing and retrieving data from a plurality of rotating tracks. Each surface contains a set of tracks and each track includes sequentially located sectors of storage data. A storage interface is connected to the storage device to control the storing and retrieving of data from this device. The interface includes a data buffer and a command buffer. The command buffer is divided into sets of command elements and each set of command elements is dedicated to one of the storage devices connected. A set of command elements is also dedicated to reading the data buffer. A storage driver is provided connected to the interface. The storage driver received storage device access commands from a processor. The driver services a plurality of command queues each one dedicated to a storage device and its respective set of command element buffers in the interface. The driver further includes the capability to provide commands for data that has not been requested by a processor for storage in the interface data buffer.

In this driver, the commands for data not requested by the processor are generated in response to commands from the processor. The driver further includes the capability to examine the commands in the command queues for each of the storage devices to determine if sequential sectors are being requested. In response to the request for sequential sectors, a series of commands for adjacent sectors not requested by the processor are made. These sectors that have not been requested are then stored in the interface data buffer. When the driver receives a read command in the command queue, it can determine if the requested data is in the buffer. This data is then retrieved from the data buffer without accessing the storage device.

BRIEF DESCRIPTION OF THE DRAWING

The novel features believed characteristics of the invention are set forth in the appended claims. The invention itself, however, as well as other features and advantages thereof, will be best understood by reference to the following description of the preferred embodiment, when read in conjunction with the accompanying figures, wherein:

BEST MODE FOR CARRYING OUT THE INVENTION

When data is accessed from a hard file in a data processing system, a read request is usually queued by the system software. The hard file device driver then dequeues this command and sends it to a hard file interface. If the data to be read is sequential, i.e., requesting a series of data sectors located adjacently on a single track, it is important to issue these new read requests to the interface circuit or adapter fast enough so that the disk head does not have to wait for a second revolution to read the next located data block.

The present invention provides three mechanisms to achieve a lower access time for a rotating hard file. The first is a software device driver that detects sequential read patterns from a set of read commands and issues "read ahead" commands. The second is the data buffer on an adapter card (for Hard File Device Interface). This buffer is divided into "cache blocks" that hold data provided in response to the Input/Output commands including the read ahead commands. The third feature is that the commands are actually queued in command element buffers on the adapter.

Figure 1A:
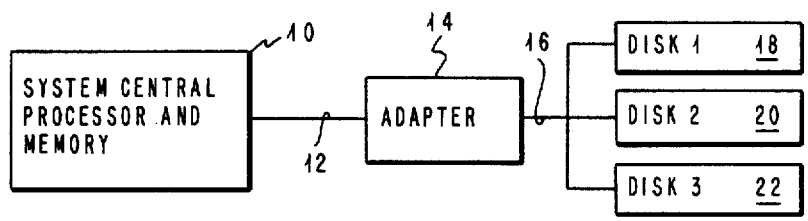
FIG. 1A is a block diagram of a data processing system.
Figure 1B:
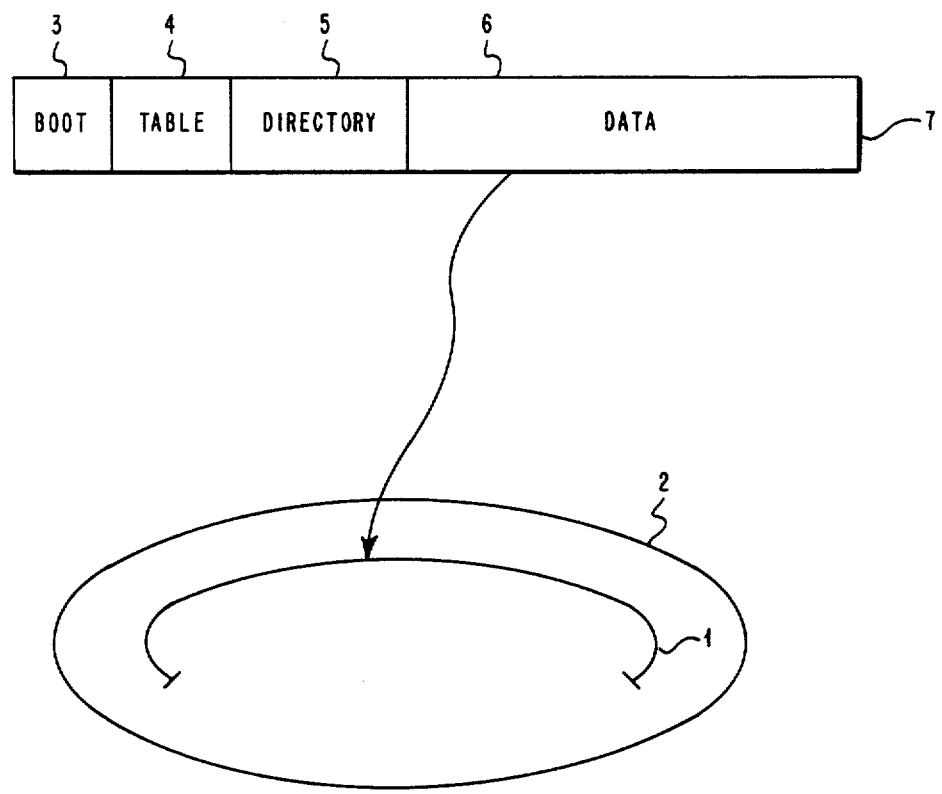
FIG. 1B is an illustration of a disk storage device and a track located thereon.

FIG. 1A is a block diagram of the overall system for the present invention. In FIG. 1A a system central processor 10 is connected by a bus 12 to an adapter 14. This adapter is a hard file interface device that is connected by bus 16 to three rotating hard file disk 18, 20 and 22. It should be understood by those skilled in the art that this invention will work for any number of hard files connected to in adapter 14, provided that enough buffer space is located on the adapter for commands and data. FIG. 1B is an illustration of a prior art rotating hard file disk such as dish 18, 20 or 22 of FIG. 1A. The track 1 is illustrated as a sequence of information 7 including a Boot portion 3, Table portion 4, Directory portion 5 and Data portion 6. The Boot 3 is reserved for a bootstrap program. The Table 4 details data blocks of the Data portion 6 that are available. Directory 5 records the files of Data 6 on the disk.

Figure 2:
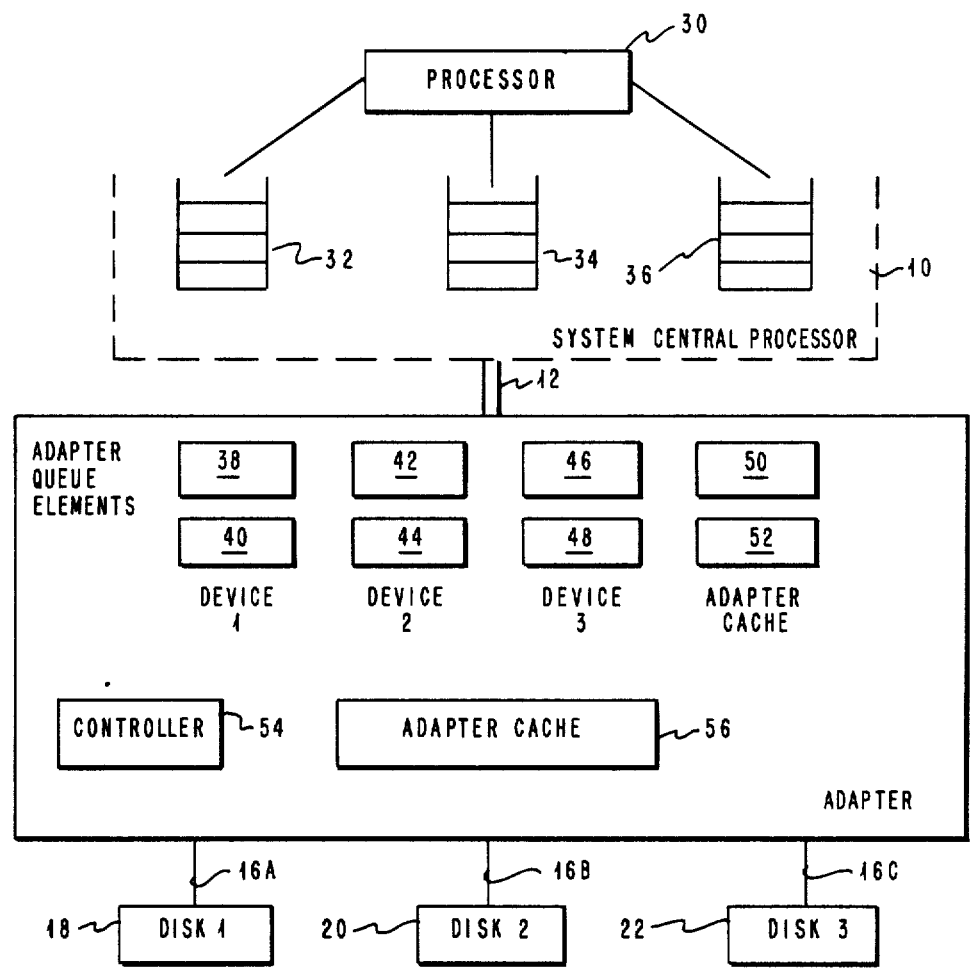
FIG. 2 is a block diagram of a storage device driver connected, to an interface and storage devices.

FIG. 2 illustrates the contents of the system processor 10 and the adapter 14 related to the invention. Storage device driver software is executed in the CPU processor 30 to support application software tasks also being executed in the CPU processor 30. The storage device driver software receives commands from three command queues 32, 34 and 36. Each command queue 32, 34 and 36 corresponds respectively to one of the disk 18, 20 and 22. The storage device driver software in CPU processor 30 communicates with the adapter 14 by the bus 12. The adapter 14 includes a command buffer having queue elements 38 40, 42, 44, 46, 48, 50 and 52. The adapter queue elements 38 and 40 are dedicated to disk 1 18. Likewise, queue elements 42 and 44 are dedicated to disk 2 20 and elements 46 and 48 are dedicated to disk 3 22. The adapter 14 further includes an adapter cache 56. In the preferred embodiment this cache includes 16 kbytes of RAM divided into 32 blocks of 512 bytes each. Each block corresponds to data that is retrieved from one of the disks 18, 20 or 22.

Each queue element such as 38 or 40 stores a single command from the storage device driver executing in CPU processor 30. The adapter 14 further includes a controller 54 that provides the adapter processing capability to interface to both the disk 18, 20 and 22 and the system central processor 10.

The system device driver issues one of four commands to the adapter 14. These include write, read, read ahead, and read cache. The write command is a request that data from the system central processor 10 memory (contained internally) be written to the designated disk. The read command requests that data be retrieved from the disk and provided to the system central processor 10 memory. The read ahead command is generated by the storage device driver software in response to read commands issued by applications software in the CPU processor 30. The read ahead command requests data to be read from the disk to one of the adapter cache blocks in the adapter cache 56. The read cache command is generated by the storage device driver in response to a read command when the storage device driver has determined that the data that is being requested by the read command is in fact stored in the adapter cache 56. Therefore, this data in the adapter cache can be provided without accessing any of the disks.

It should be emphasized that read ahead commands do not require any extra disk seek (movement of the head) or rotation time. They are issued for the disk sectors that are following the sectors actually requested by read commands that have been stored in the command queues 32, 34, 36. The number of read ahead commands issued in response to read commands in the command queues 32, 34, 36 is dependent upon whether the system storage driver determines that such a command is part of a sequential access and a determination as to the number of disks that are currently in use. Therefore, the actual cost of executing a read command at the adapter is extremely small. The benefit of providing read ahead commands is that data that is likely to be requested will be available at the adapter cache 56 and that the disk will not have to be accessed. This saves disk seek and rotation time.

Figure 3A:
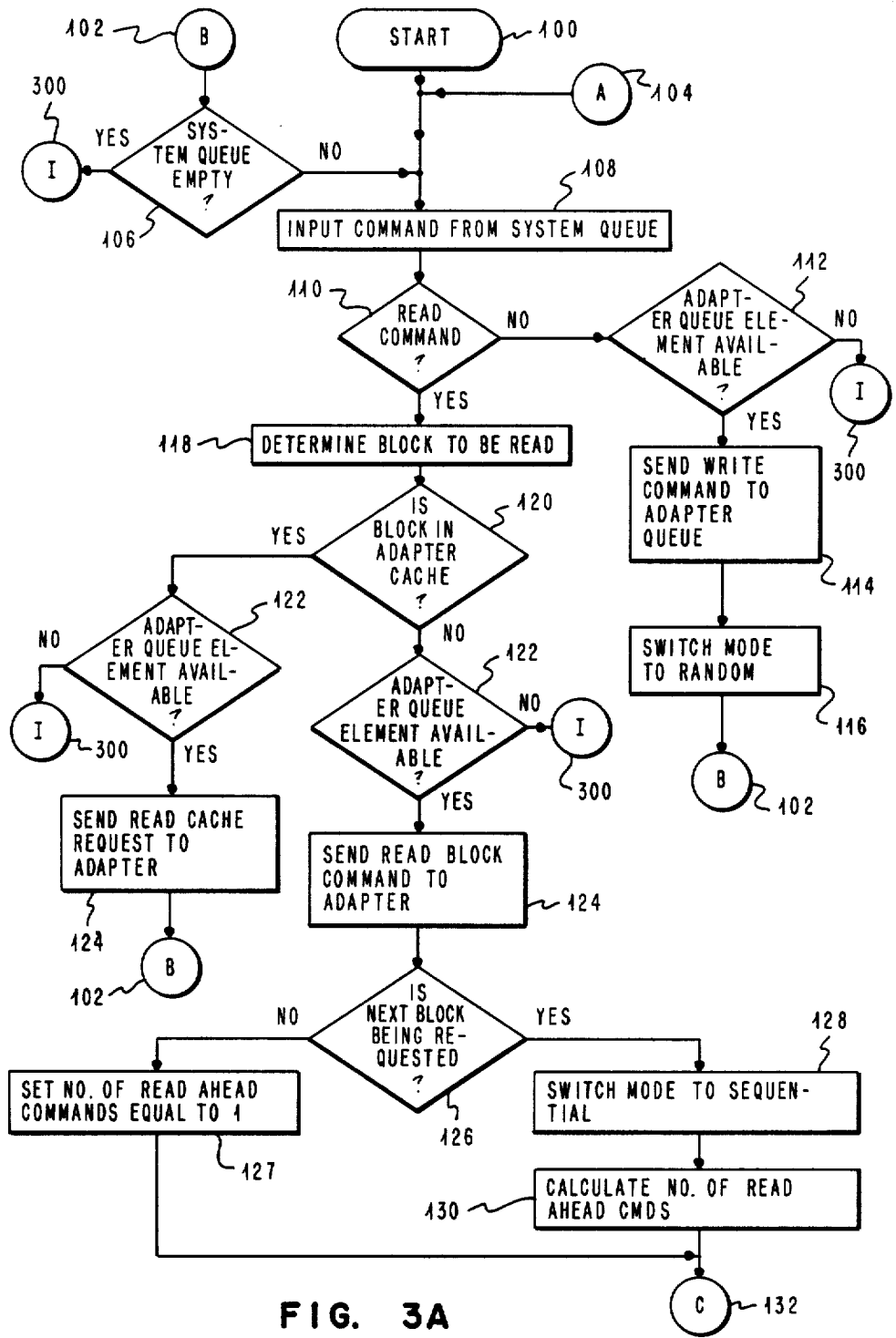
FIGS. 3A and 3B are flow charts illustrating the storage device driver procedures for responding to storage device commands.
Figure 3B:
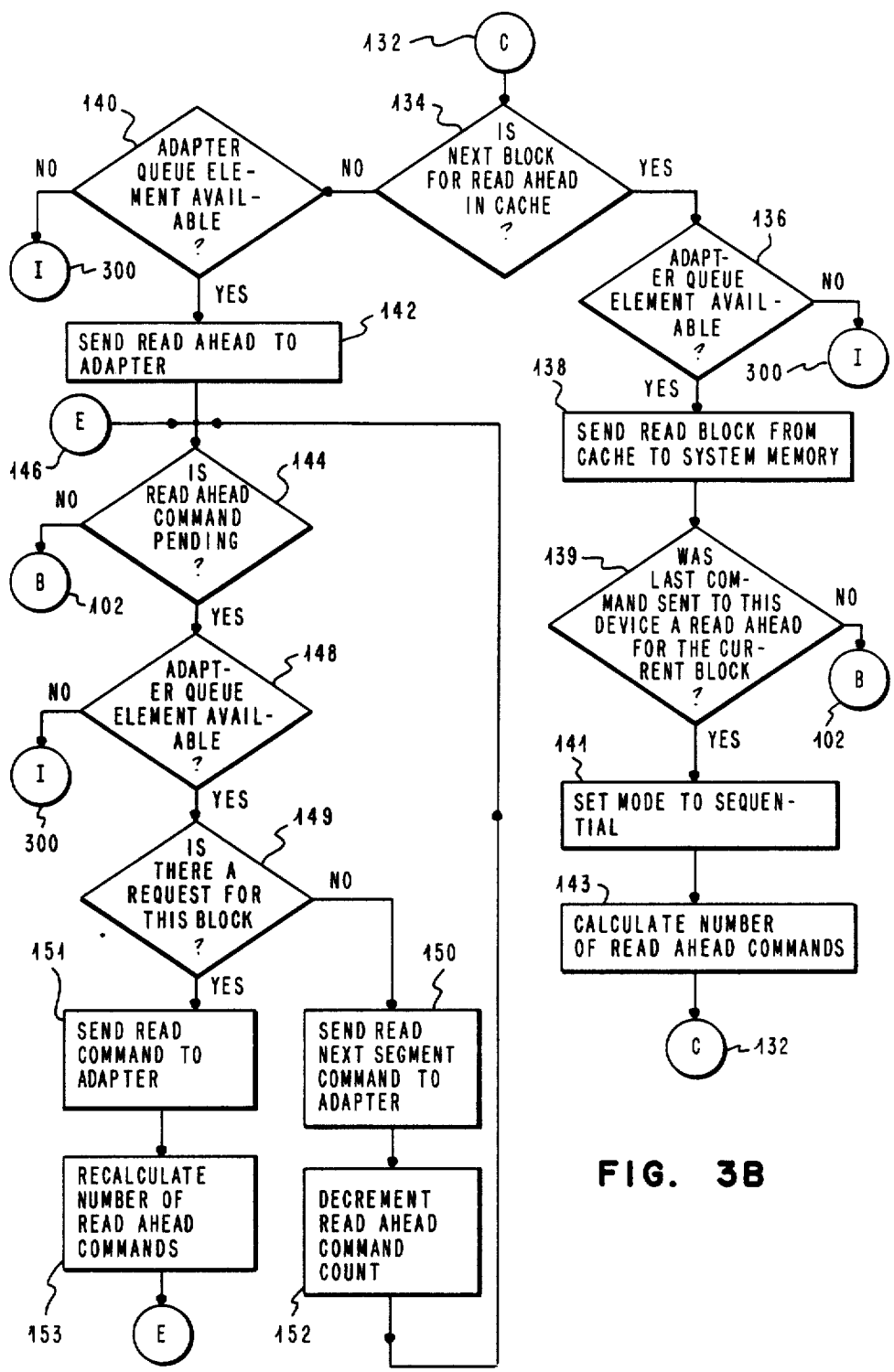

The storage device driver software is illustrated in flow chart form in FIGS. 3A, 3B, 4 and 5. FIGS. 3A and 3B list the flow chart for the software that provides the commands to the adapter 14. The flow charts in FIGS. 3A and 3B are executed for each disk device independently. Referring to FIG. 3A, the storage device driver starts in location 100 proceeds to step 108 to input a command from one of the system queues 32, 34 or 36. The driver then proceeds to step 110 to determine if it is a read command. If not, the driver proceeds to step 112 knowing that this command is a write command and determines in step 112 if an adapter queue element is available. If not, the driver proceeds to step 300 which executes the software illustrated in FIG. 5. However, if a queue element is available, the driver proceeds to step 114 to send a write command to the adapter queue for storage in the available queue element. The driver then switches the mode to random to indicate that only a single read ahead should be performed on the next read cycle. The driver then proceeds to connector 102 to step 106 to determine if the system queue is empty. If so, the driver exits to the software in FIG. 5 (connector 300). If not, the driver proceeds again to step 108.

Returning to step 110, if the command is a read, the driver proceeds to step 118 to determine which block is to be read. Then in step 120 the driver decides whether or not the block is in the adapter cache. If so the driver proceeds to step 122 to determine if the adapter queue element for the cache is available. If not, the driver proceeds through connector 300 to the software in FIG. 5. If a cache queue element is available, the driver proceeds to step 124 to send the read cache command to the adapter cache queue element and returns via collector 102 to step 106. Returning to step 120, if the block is not in the adapter cache, the driver proceeds to step 122 to determine if an adapter queue element is available for that device. If not, the driver proceeds through connector 300 to the software in FIG. 5 If so, the driver proceeds to step 124 to send a read block command to the adapter queue elements for that device. The driver then proceeds to step 126 to determine if the next read request in the queue is for the following block. If not, the driver proceeds to step 127 to set the number of read ahead commands to one and then proceeds to connector 132 to the software in FIG. 3B. If it is, the driver proceeds to step 128 to switch the mode to sequential. Then, in step 130, the driver calculates the number of read ahead commands and sends these commands to the adapter. In the preferred embodiment, the number of read ahead commands for sequential mode is determined in accordance with the number of disk devices in use. If only one device is in use, then six read ahead commands are issued. If two devices are in use, then five read ahead commands are issued. If three devices are in use, four read ahead commands are issued.

The driver then proceeds to connector 132 and to step 134 (FIG. 3B). In step 134, the driver determines if the next block is in the cache If so, the driver proceeds to step 136 to determine if an adapter queue element for the cache is available If so, then the adapter sends a read command from the adapter in step 138 and proceeds to step 139 to determine if the last command sent was a read ahead for the current block. If not, the driver exits through connector 102 back to step 106 (FIG. 3A). If so; the driver proceeds to step 141 to set the mode to sequential, to stop 143 to calculate the number of read ahead commands and to connector 132 to step 134 Returning to step 136 if an adapter queue element for the cache is not available, the driver proceeds through connector 300 to the software in FIG. 5.

Returning to step 134, if the data does not exist in the adapter cache, the driver proceeds to step 140 to determine if an adapter queue element is available. If not, the driver proceeds through connector 300 to the software in FIG. 5 and if so, the driver proceeds to step 142 to send a read command for the next block to the adapter. The driver proceeds to step 144 to determine if there is a read ahead command pending. If not, the driver proceeds through connector 102 back to step 106 (FIG. 3A). If so, the driver proceeds to step 148 to determine if an adapter queue element is available for this read ahead command. If no adapter queue element is available, the driver proceeds to connector 300 to the software in FIG. 5 If an adapter queue element is available, the driver proceeds to step 149 to determine if there is a pending request for the block requested by the read ahead command. If so, the driver proceeds to step 151 to send a read command to the adapter, then to step 153 to recalculate the number of read ahead commands and then to connector 146. Returning to step 149, if there is no request for this block the driver proceeds to step 150 to send a read ahead command to the adapter and then to step 152 to decrement the read ahead command count. The driver then returns to step 144 to service the remaining read ahead commands.

Figure 4:
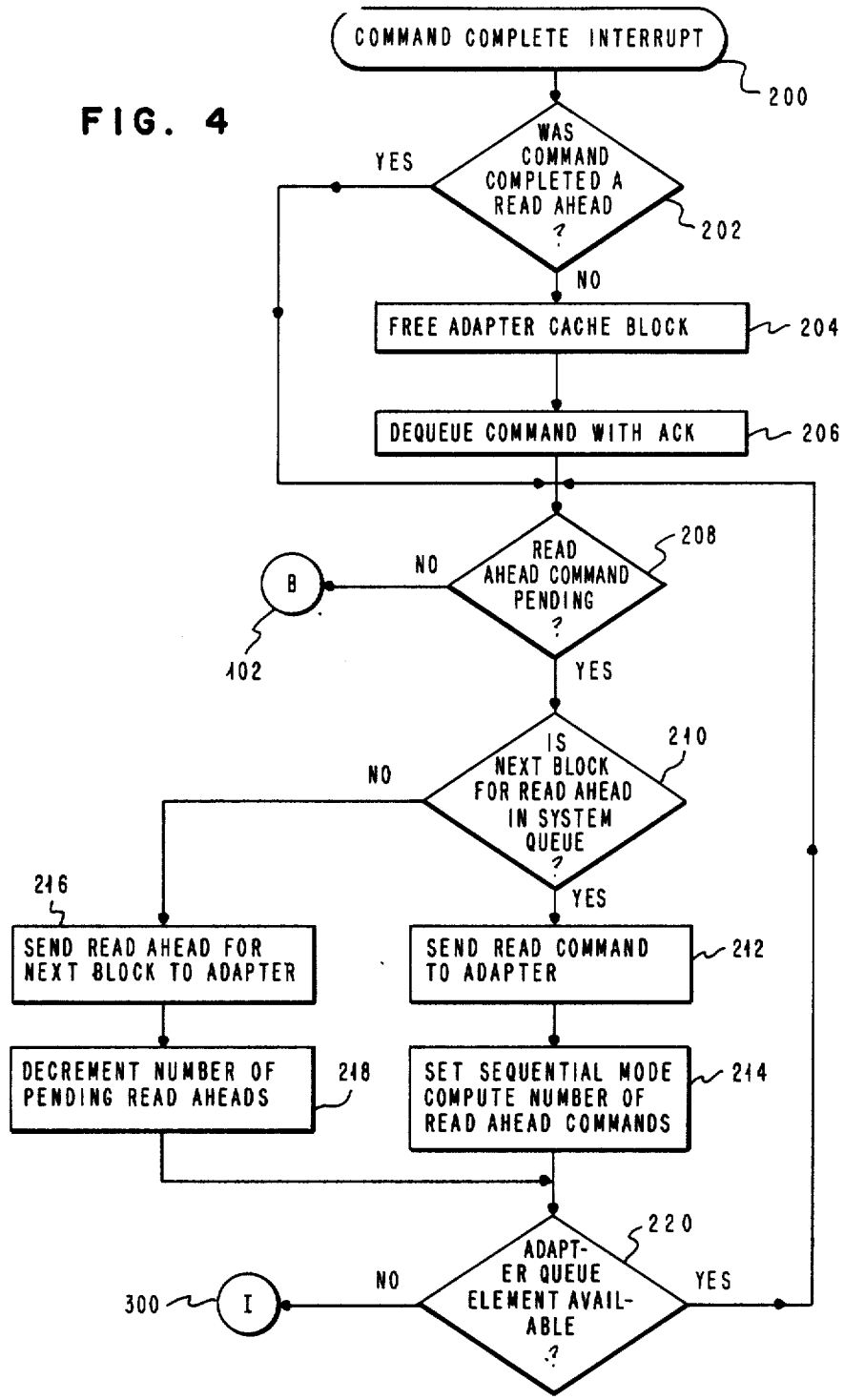
FIG. 4 is a flow chart illustrating the storage device driver procedures for responding to a command complete interrupt from the storage interface.

FIG. 4 illustrates the operation of the driver software upon the occurrence of a command interrupt from the adapter 14. When the adapter 14 has completed a read, write, read ahead, or read cache command, the driver is notified by a command complete interrupt. While the driver is executing the software in FIGS. 3A, 3B and 5, a command complete interrupt will interrupt the operation of this software. Referring to FIG. 4, the command complete interrupt will cause the driver to start at point 200 and proceed to step 202 in order to determine if the command that was completed was a read ahead command. If so, the driver proceeds to step 208. If not, then the driver frees an adapter cache block in step 204 and dequeues the command from the device queue with an acknowledge (ACK). The driver proceeds to step 208 to determine if a read ahead command is then pending. If not, the driver proceeds through connector 102 to step 106 (FIG. 3A). If a read ahead command is pending, the driver proceeds to step 210 to determine if the next block for the read ahead is included in one of the read commands in the command queues (queues 32, 34 or 36). If so, the driver proceeds to step 212 to send a read command for the requested block to the adapter and in step 214 sets the sequential mode in order to compute the number of read ahead commands as previously discussed. Returning to step 210, if the next block is not in the system queue, the driver proceeds to step 216 to send a read ahead command for the next segment to the adapter and decrements the number of pending read ahead commands in step 218 The device driver exiting either step 218 or step 214 proceeds to step 220 to determine if an adapter queue is available. If so, the driver returns to step 208. If not, the driver proceeds to the software in FIG. 5 through connector 300.

Figure 5:
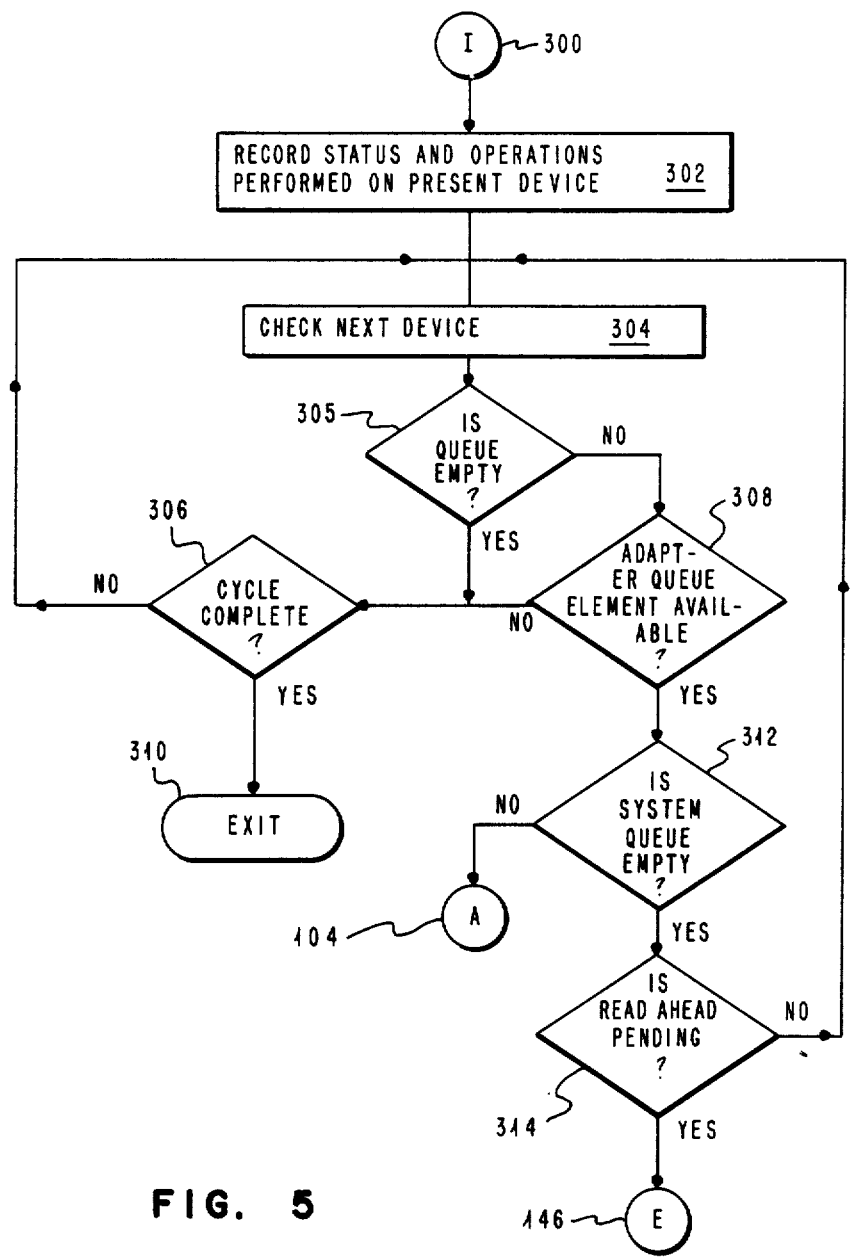
FIG. 5 is a flow chart illustrating the procedure performed by the storage device driver when serving two or more storage devices.

In FIG. 5, the procedure illustrated serves as a system bookkeeper for all the storage devices being serviced. In step 302 the driver records the status and operations performed on the current storage device. It is important to note when no operations are performed on a storage device. This fact is used not only in the computation of the number of read aheads but also for determining when all devices have been sufficiently serviced. The driver then proceeds to check the next device in step 304. The driver then determines if the command queue is empty in step 305. If so, the driver proceeds to step 306 If not, the driver proceeds to step 308. In step 308, the driver determines whether or not an adapter queue element is available for that device, if so, the driver proceeds to step 312 to determine if the system queue for that device is empty. If not, the driver proceeds through connector 104 to step 108 (FIG. 3A). If the system queue element for that storage device is empty, the device driver proceeds to step 314 to determine if any read aheads are pending for that device. If read ahead commands are pending, the driver then proceeds through connector 146 to step 144 (FIG. 3B). If no read aheads are pending the driver returns to step 304. In step 308, if an adapter queue element is not available for that device, the driver proceeds to step 306 to determine if all of the devices have been adequately serviced. In other words, has the driver accessed the storage devices without having to perform any function. If so, the device driver exits in step 310. If not, the device driver returns to step 304.

Although the invention has been described with reference to this specific embodiment, this description is not meant to be construed in a limiting sense. Various modification of the disclosed embodiment, as well as other embodiments of the invention, will become apparent to those persons skilled in the art upon reference to the description of this invention. It is, therefore, contemplated that the appended claims will cover any such modification or embodiments as fall within the true scope of the invention.

We claim:

1. A data processing system comprising:
   at least one storage means, each for storing and retrieving data from a plurality of rotating tracks and each including sequentially located sectors for the storage of data;
   means, connected to each of said storage means, for identifying data stored on each of said sectors of said plurality of rotating tracks;
   a storage interface means for controlling the storing and retrieving of data from one of said storage means and including a data buffer means for storing data retrieved from or to be stored in said storage means; and
   a processor including an application program and a storage driver means for receiving a plurality of access requests from said application program and for providing first access commands to said storage interface means in response thereto and including means, connected to said identifying means and said storage driver means, for determining when at least tow of said access requests in said storage driver means are for data that, according to said identifying means, are stored in sequentially located sectors on one of said rotating tracks, and means for providing second access commands for data not requested by said application program in response to such determination.

2. A data processing system according to claim 1 wherein said means for providing second access commands for data not requested by the application program, includes means for storing said data not requested by said application program in said data buffer means.

3. A data processing system according to claim 2 wherein said storage driver means for providing said second access commands for data not requested by the application program includes means for providing such access commands in response to said access requests for requested data.

4. A data processing system according to claim 3 wherein said storage driver means includes means for determining when access requests from said application program include access requests for data stored in the data buffer means and in response thereto, for providing said second access commands for retrieving data from said data buffer means.

5. A data processing system according to claim 4 wherein said storage driver means includes means for determining from said access requests from said application program if data is being requested from said storage means that is sequentially located in one of the plurality of tracks and in response thereto, for issuing said second access commands for accessing data contained in a plurality of sequentially located sectors for storage in said data buffer means.

6. A data processing system comprising:
   at least one storage means, each for storing and retrieving data from a plurality of rotating tracks and each including sequentially located sectors for the storage of data;
   means, connected to each of said storage means, for identifying data stored on each of said sectors of said plurality of rotating tracks;
   a storage interface means for controlling the storing and retrieving of data from one of said storage means and including a data buffer means for storing data retrieved from said storage means and a plurality of command buffers each for storing access commands for a respective one of said storage means and said data buffer means; and
   a processor including an application program and a storage driver means for receiving access requests from said application program, storing said received access requests in one of a plurality of command queues, providing first access commands in response thereto to one of a plurality of said command queues, including means, connected to said identifying mean sand said plurality of command queues, for determining when at least tow of said access requests in said command queues are for data that, according to said identifying means, are stored in sequentially located sectors on one of said rotating tracks, and including means for providing second access commands for data not requested by said application program in response to a determination that sequentially located data is being requested by said access requests.

7. A data processing system according to claim 6 wherein said means for providing said second access commands for data not requested by the application program, includes means for storing said data not requested by said application program in said data buffer means.

8. A data processing system according to claim 7 wherein said storage driver means for providing second access commands for data not requested by the application program includes means for providing such second access commands in response to said access requests from said application program.

9. A data processing system according to claim 8 wherein said storage driver means includes means for determining when access requests from said application program include requests for data stored in the data buffer means and in response thereto for providing said second access commands for retrieving data from said data buffer means.

10. A data processing system according to claim 9 wherein said storage driver means includes means for determining if access requests int he command queues or said command buffers include said first access commands to retrieve sequential data sectors in said storage means tracks and in response thereto providing said second access commands for data not requested by application program.

11. A data processing system according to claim 10 wherein said storage driver means includes means for providing said first access commands from said command queues to said command buffers for the respective storage means.

12. A data processing system according to claim 11 wherein said storage driver means includes means for providing said second access commands for data not requested by said application program to said command buffers.

13. A data processing system according to claim 12 wherein said storage interface means includes means for indicating to said storage driver means when either a first or second access command in one of said command buffers has been completed.

14. A data processing system according to claim 13 wherein said second access commands for data not requested by said application program are provided in response to a determination of an active number of storage means.

15. A data processing system according to claim 14 wherein each of said second access commands for data not requested by said application program are for an amount of data equal to an amount from a previous first access command for data requested by said application program.

16. A data processing system according to claim 15 wherein said storage driver means includes means for sequentially ordering said access requests from the application program int he command queues according to an access procedure for providing access of data form each of said storage means.

17. A data processing method comprising the steps of:
storing and retrieving data from a plurality of rotating tracks, each including sequentially located sectors for the storage of data;
identifying data stored on each of said sectors of said plurality of rotating tracks;
controlling the storing and retrieving of data from one of said rotating tracks with a storage interface means and storing data retrieved from or to be stored in a data buffer in said storage interface means; and
receiving a plurality of access requests form an application program and providing first access commands to said storage interface means in response thereto and determining when at least two of said access requests in said storage driver means are for data that are stored in sequentially located sectors on one of said rotating tracks and providing second access commands for data not requested by said application program in response to such determination.

18. A data processing method comprising the steps of:
storing and retrieving data from a plurality of rotating tracks, each including sequentially located sectors for the storage of data;
identifying data stored on each of said sectors of said plurality of rotating tracks;
controlling the storing and retrieving of data from one of said rotating tracks in a storage means and storing data retrieved from said rotating tracks in a data buffer; and
receiving access requests from an application program, storing said received access requests in one of a plurality of command queues, providing first access commands in response thereto to one of a plurality of said command queues, determining when at least tow of said access requests in said command queues are for data that are stored in sequentially located sectors on one of said rotating tracks, and providing second access commands for data not requested by said application program in response to a determination that sequentially located data is being requested by said access requests.

* * * * *

UNITED STATES PATENT AND TRADEMARK OFFICE
CERTIFICATE OF CORRECTION

PATENT NO. : 4,972,364

DATED : November 20, 1990

INVENTOR(S) : Gerald G. Barrett, Syed Z. Pasha and Amal A. Shaheen-Gouda

It is certified that error appears in the above-identified patent and that said Letters Patent is hereby corrected as shown below:

Col. 7, line 24, please delete "tow" and insert --two--;

Col. 8, line 12, please delete "mean sand" and insert --means and--;

Col. 8, line 13, please delete "tow" and insert --two--;

Col. 8, line 43, please delete "int he" and insert --in the--;

Col. 9, line 10, please delete "int he" and insert --in the--;

Col. 9, line 11, please delete "form" and insert --from--;

Col. 9, line 24, please delete "form" and insert --from--;

Col. 10, line 1, after "tracks" please insert --,--;

Col. 10, line 21, please delete "tow" and insert --two--.

Signed and Sealed this

Eighteenth Day of August, 1992

Attest:

DOUGLAS B. COMER

*Attesting Officer*    *Acting Commissioner of Patents and Trademarks*

UNITED STATES PATENT AND TRADEMARK OFFICE
CERTIFICATE OF CORRECTION

PATENT NO. : 4,972,364
DATED : November 20, 1990
INVENTOR(S) : C.G. Barrett et al.

It is certified that error appears in the above-indentified patent and that said Letters Patent is hereby corrected as shown below:

IN THE CLAIMS

Col., 9, line 28, please delete "driver" and insert --interface--.

Signed and Sealed this

Twenty-ninth Day of May, 2001

Attest:

NICHOLAS P. GODICI

*Attesting Officer*  *Acting Director of the United States Patent and Trademark Office*